(No Model.)
P. MEYER.
HARROW.
No. 340,236. Patented Apr. 20, 1886.
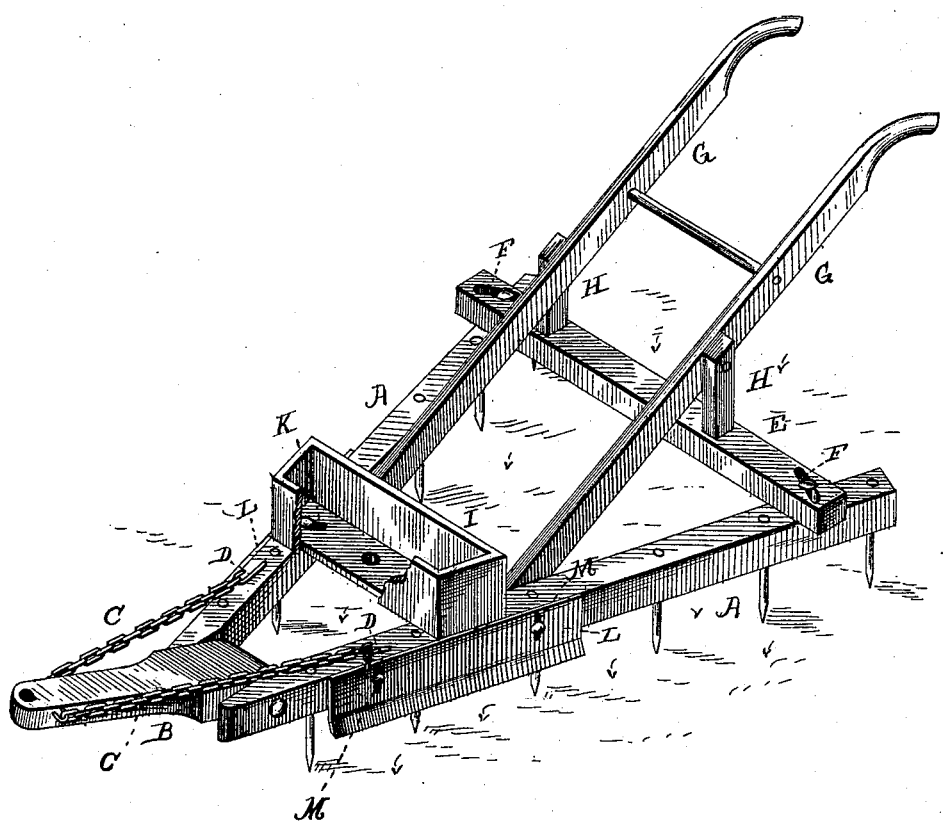
WITNESSES
Chas. H. Davis
John Bales.
Philip Meyer.
INVENTOR
by Frank Sheehy
his Attorney

UNITED STATES PATENT OFFICE.

PHILIP MEYER, OF FALLS CITY, NEBRASKA.

HARROW.

SPECIFICATION forming part of Letters Patent No. 340,236, dated April 20, 1886.

Application filed September 1, 1885. Serial No. 175,874. (No model.)

*To all whom it may concern:*

Be it known that I, PHILIP MEYER, a citizen of the United States, residing at Falls City, in the county of Richardson and State of Nebraska, have invented certain new and useful Improvements in Harrows; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to improvements in harrows, and is designed to improve the device patented to me on June 2, 1885, and numbered 319,109.

The design of the present improvement is to provide a shield that will prevent young plants from being harmed from the clods of earth the harrow throws outward, to provide a means for cutting and killing grass and weeds, and also a means whereby the harrow may be adjusted as to width.

Referring to the drawing, which represents a perspective view of the device, A designates the diverging side beams beveled at the contiguous ends, there holding by means of a pivot-bolt a draft-beam, B, which, by means of chains C and hooks D, may be adjusted vertically. To the rear of the beams A is secured a bracing cross-piece, E, by means of bolts passing through the slots F diagonal to the length of said beam. The handles G are fixed at their forward ends to the beams A, and are supported at the rear by standards H; hence the beam or cross-piece E cannot change its position, and to spread the beams A the slots must be diagonally placed corresponding to the line of travel of the bolts. The adjustment is to different width of spaces between the rows.

On the forward ends of the beams is placed a weight-box, I, having slots K for the securing-bolts to travel in when the beams A are adjusted. On the side of each beam is a plate, L, having its lower free edge at an angle to the main part, and has its securing devices pass through slots M, so that the said plate will be vertically adjustable. This plate forms a guard, preventing the clods from rolling over on the young plants and crushing them.

The edge of the guard or shield is sharp, so as to cut off all grass and weeds, while the teeth to the rear of the shield cultivates the ground, killing the said grass and weeds.

The shield or guard does not extend but a portion of the length of the beam. The beveled portion conforms to the shape of the furrow, and prevents too great an accumulation of material under it.

I claim—

1. The harrow described, consisting of the frame adjustable as to width, the adjustable pivoted draft-beam, the weight-box, and the vertically-adjustable guards or shields, substantially as and for the purpose specified.

2. In combination with the side beams of a V-shaped harrow, the vertically-adjustable guards or shields consisting of plates with edges at an angle to the main portions, and slotted for the passage of the securing devices, substantially as and for the purpose specified.

In testimony whereof I affix my signature in presence of two witnesses.

PHILIP MEYER.

Witnesses:
M. W. MUSSELMAN,
CREIGHTON MORRIS.